(12) United States Patent
Gardner et al.

(10) Patent No.: US 7,524,109 B2
(45) Date of Patent: Apr. 28, 2009

(54) SYSTEMS AND METHODS FOR RESISTANCE COMPENSATION IN A TEMPERATURE MEASUREMENT CIRCUIT

(75) Inventors: Marco A. Gardner, Tucson, AZ (US); Jerry L. Doorenbos, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 191 days.

(21) Appl. No.: 11/738,584

(22) Filed: Apr. 23, 2007

(65) Prior Publication Data
US 2008/0259999 A1  Oct. 23, 2008

(51) Int. Cl.
*G01K 7/00* (2006.01)
(52) U.S. Cl. ........................ 374/178; 374/191
(58) Field of Classification Search .................. 374/178, 374/181, 197
See application file for complete search history.

(56) References Cited

U.S. PATENT DOCUMENTS

| | | | |
|---|---|---|---|
| 4,618,268 A * | 10/1986 | Horner ........................ 374/115 |
| 5,195,827 A | 3/1993 | Audy | |
| 5,213,416 A * | 5/1993 | Neely et al. .................. 374/178 |
| 5,867,012 A | 2/1999 | Tuthill | |
| 5,961,215 A * | 10/1999 | Lee et al. ..................... 374/178 |
| 5,982,221 A * | 11/1999 | Tuthill ........................ 327/512 |
| 6,097,239 A | 8/2000 | Miranda, Jr. et al. | |
| 6,133,753 A | 10/2000 | Thomson et al. | |
| 6,169,442 B1 | 1/2001 | Meehan et al. | |

OTHER PUBLICATIONS

U.S. Appl. No. 11/738,566, filed Apr. 23, 2007, Doorenbos et al.
U.S. Appl. No. 11/738,571, filed Apr. 23, 2007, Gardner et al.
U.S. Appl. No. 11/738,595, filed Apr. 23, 2007, Doorenbos et al.
Analog Devices Data Sheet, +/− 1 C Remote and Local System Temperature Monitor (ADM1032), 2005, printed from analog.com, May 24, 2007.
Analog Devices Data Sheet, +/−C Temperature Monitor with Series Resistance Cancellation (ADT7461), 2005, printed from analog.com, May 24, 2007.
Maxim Data Sheet, Remote/Local Temperature Sensor with SMBus Serial Interface, (MAX1617A), Jan. 1999, printed from www.maxim-ic.com, May 24, 2007.
Pertijs et al. "A Cmos Smart Temperature Sensor" IEEE J. Solid-State Circuits, vol. 40, No. 12, Dec. 2005.
SMSC Data Sheet 1 Degree D Triple SMbus Sensor with Resistance Error Correction, (EMC1033), Jan. 2007,printed from www.smsc.com.

* cited by examiner

*Primary Examiner*—Andre J Allen
(74) *Attorney, Agent, or Firm*—John J. Patti; Wade J. Brady, III; Frederick J. Telecky, Jr.

(57) ABSTRACT

Various systems and methods for temperature measurement are disclosed. For example, some embodiments of the present invention provide methods for temperature measurement that include exciting a provided transistor with at least four sequential input signals of different magnitudes. In response, the transistor exhibits a sequence of output signals corresponding to the four sequential input signals. The sequence of output signals is sensed using a different gain for each of the output signals included in the sequence of output signals, and the output signals included in the sequence of output signals are combined such that the combined output signals eliminates a resistance error. The combined output signals are then used to calculate a temperature of the transistor.

20 Claims, 3 Drawing Sheets

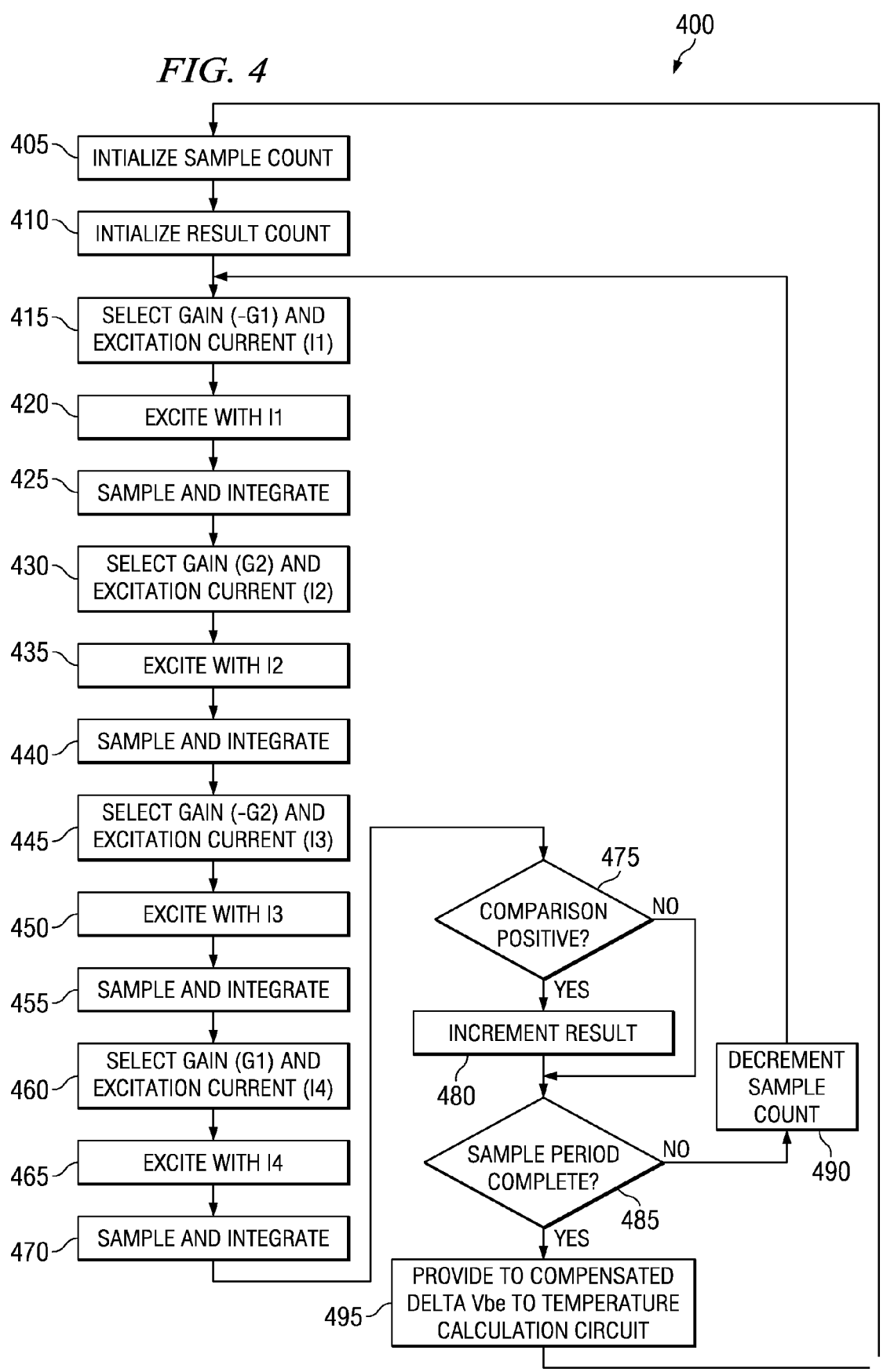

SYSTEMS AND METHODS FOR RESISTANCE COMPENSATION IN A TEMPERATURE MEASUREMENT CIRCUIT

BACKGROUND OF THE INVENTION

The present invention is related to temperature measurement, and more particularly to temperature measurements using a transistor or diode as a sensor.

Temperature measurement using a transistor as a sensor is a common application in the semiconductor area. Such a temperature measurement is done by applying two different currents to the transistor each resulting in a respective base-emitter voltage. The difference between the two different base-emitter voltages is proportional to the absolute temperature of transistor 144. The following equation defines the relationship between the difference between base-emitter voltage measurements and absolute temperature:

$$\Delta V_{be} = V_{be2} - V_{be1} = n^* kT/q^* \ln(I_2/I_1).$$

The 'n' term is known as the non-ideality factor or emission coefficient is assumed to be a constant (n=1.008) for diodes and transistors.

An example of such a temperature measurement circuit 100 is shown in FIG. 1a. Turning to FIG. 1a, temperature measurement circuit 100 includes a transistor 120 that is used as a temperature sensor. The collector and the base of transistor 120 are electrically coupled to a variable current source 110. Further, the base of transistor 120 is electrically coupled to one input of an analog to digital converter 130, and the emitter of transistor 120 is electrically coupled to another input of analog to digital converter 130. Analog to digital converter 130 is operable to receive the voltages at the base and emitter of transistor 120, and to provide a $\Delta V_{be}$ output 135 representing the difference between two different base to emitter voltages. $\Delta V_{be}$ output 135 is provided to a temperature calculation circuit 140 that provides an uncorrected temperature output 145.

In some cases, an input filter 134 including a series resistor 131, a series resistor 132, a and a capacitor 133 is used. Input filter 134 is operable to filter noise from the voltages received from the base and emitter of transistor 120. While input filter 134 operates to increase the accuracy $\Delta V_{be}$ output 135 and thereby increase the accuracy of uncorrected temperature 145, the series resistance introduced by input filter 134 results in an error in uncorrected temperature 145. In particular, the resistance introduced by series resistor 131 and series resistor 132 (and in some cases non-idealities of transistor 120) causes a voltage drop that is a function of the magnitude of an applied current. This voltage drop is described by the following equation:

$$\Delta V_{be} = V_{be2} - V_{be1} = (I_{e2} - I_{e1})^* R_s + n^* kT/q^* \ln(I_{c2}/I_{c1}).$$

$I_{e1}$ is the current passing through the emitter upon application of a first current, and $I_{c1}$ is the current passing through the collector upon application of the same current. $I_{e2}$ and $I_{c2}$ are similarly emitter and collector currents corresponding to the application of a second current. $R_s$ is the series resistance. The voltage drop described by the aforementioned equation will create a temperature measurement error if not taken into account by the circuit.

To correct for the aforementioned temperature error, some circuits have included a backend offset circuit designed to add or subtract a calculated constant from uncorrected temperature 145 and thereby achieve a corrected temperature. FIG. 1b shows an example of one such temperature calculation circuit 101. As shown, temperature calculation circuit 101 is substantially similar to temperature calculation circuit 100, except for the addition of a temperature offset adder circuit 150. Temperature offset adder circuit 150 receives uncorrected temperature 145 and a programmed temperature offset input 147. The two inputs are added together to create a corrected temperature output 155. While such an offset approach can effectively correct calculation errors at a given point on an operational curve, the inaccuracy of the calculated temperature still exists as operation moves farther from the aforementioned offset corrected point on the operational curve.

Thus, for at least the aforementioned reasons, there exists a need in the art for advanced systems and devices for temperature measurement.

BRIEF SUMMARY OF THE INVENTION

The present invention is related to temperature measurement, and more particularly to temperature measurements using a transistor or diode as a sensor.

Various systems and methods for temperature measurement are described herein. For example, some embodiments of the present invention provide methods for temperature measurement that include exciting a provided transistor with at least four sequential input signals of different magnitudes. In response, the transistor exhibits a sequence of output signals corresponding to the four sequential input signals. The sequence of output signals is sensed using a different gain for each of the output signals included in the sequence of output signals, and the output signals included in the sequence of output signals are combined such that the combined output signals eliminates a resistance error. The combined output signals may then be used to calculate a temperature of the transistor. In some cases of the aforementioned embodiments, the transistor is a diode connected bipolar transistor, and the sequence of output signals are base-emitter voltages of the diode connected bipolar transistor. In such cases, the bipolar transistor may be either an NPN device or a PNP device.

Other embodiments of the present invention provide temperature measurement systems. Such temperature measurement systems include a transistor, a variable current source and an analog to digital converter. The variable current source is electrically coupled to the transistor. It should be noted that as used herein, the phrase "electrically coupled" implies either direct or indirect coupling. Direct coupling would be accomplished by, for example, a wire extending directly between two coupled devices. Indirect coupling may be accomplished by, for example, coupling via other components such as, for example, capacitors, resistors, transistors, or the like. The variable current source is operable to provide at least a first current, a second current, a third current and a fourth current. The first current produces a first base-emitter voltage on the transistor, the second current produces a second base-emitter voltage on the transistor, the third current produces a third base-emitter voltage on the transistor, and the fourth current produces a fourth base-emitter voltage on the transistor. The analog to digital converter is operable sample and integrate the first base-emitter voltage while applying a first gain, wherein the analog to digital converter is operable sample and integrate the second base-emitter voltage while applying a second gain, wherein the analog to digital converter is operable sample and integrate the third base-emitter voltage while applying a third gain, wherein the analog to digital converter is operable sample and integrate the fourth base-emitter voltage while applying a fourth gain, and wherein the analog to digital converter is operable to provide an integrated output combining the first base-emitter voltage, the second base emitter voltage, the third base emitter voltage and the fourth base emitter voltage.

In some embodiments of the aforementioned embodiments of the present invention, a magnitude of the first current, a magnitude of the second current, a magnitude of the third current, a magnitude of the fourth current, a sign and magnitude of the first gain, a sign an magnitude of the second gain, a sign and magnitude of the third gain, and a sign and magnitude of the fourth gain are selected such that a resistance error is eliminated from the integrated output. In various instances of the aforementioned embodiments, the analog to digital converter includes a differential operational amplifier, a differential comparator, and a result counter. The base of the transistor is electrically coupled to a first input of the differential operational amplifier via a first input circuit and to a second input of the differential operational amplifier via a second input circuit. Further, the emitter of the transistor is electrically coupled to the first input of the differential operational amplifier via a third input circuit and to the second input of the differential operational amplifier via a fourth input circuit. In such cases, the first input circuit and the third input circuit share a first gain circuit, and the first gain circuit includes a first selectable capacitance and a second selectable capacitance. The second input circuit and the fourth input circuit share a second gain circuit, and the second gain circuit includes a third selectable capacitance and a fourth selectable capacitance. Configuring the analog to digital converter to select the first gain and configuring includes selecting the first selectable capacitance of the first gain circuit and selecting the third selectable capacitance of the second gain circuit. Configuring the analog to digital converter to select the second gain includes selecting the second selectable capacitance of the first gain circuit and selecting the fourth selectable capacitance of the second gain circuit.

Yet other embodiments of the present invention provide methods for resistance compensated temperature measurement. Such methods include providing a diode connected transistor and applying a first current, a second current, a third current and a fourth current to the diode connected transistor. In response to each of the aforementioned excitation currents, a corresponding base-emitter voltage is exhibited on the diode connected transistor. The four corresponding base-emitter voltages are combined such that a resistance error is eliminated.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 4 is a flow diagram showing a method in accordance with various embodiments of the present invention for performing series resistance compensation in a temperature measurement scenario.

DETAILED DESCRIPTION OF THE INVENTION

The present invention is related to temperature measurement, and more particularly to temperature measurements using a transistor or diode as a sensor.

Various embodiments of the present invention provide temperature measurement methods and systems. In some cases, such temperature measurement systems and methods provide for series resistance compensation through use of four base-emitter voltages and corresponding gain factors. Using such approaches provides an efficient approach to compensating for series resistance that in many cases does not require additional circuitry when compared with a standard two base-emitter voltage measurement approach. Further, using such an approach may utilize only a multiplication and subtraction function to yield a resistance corrected delta base-emitter output value that corresponds to circuit temperature.

Figure 2:
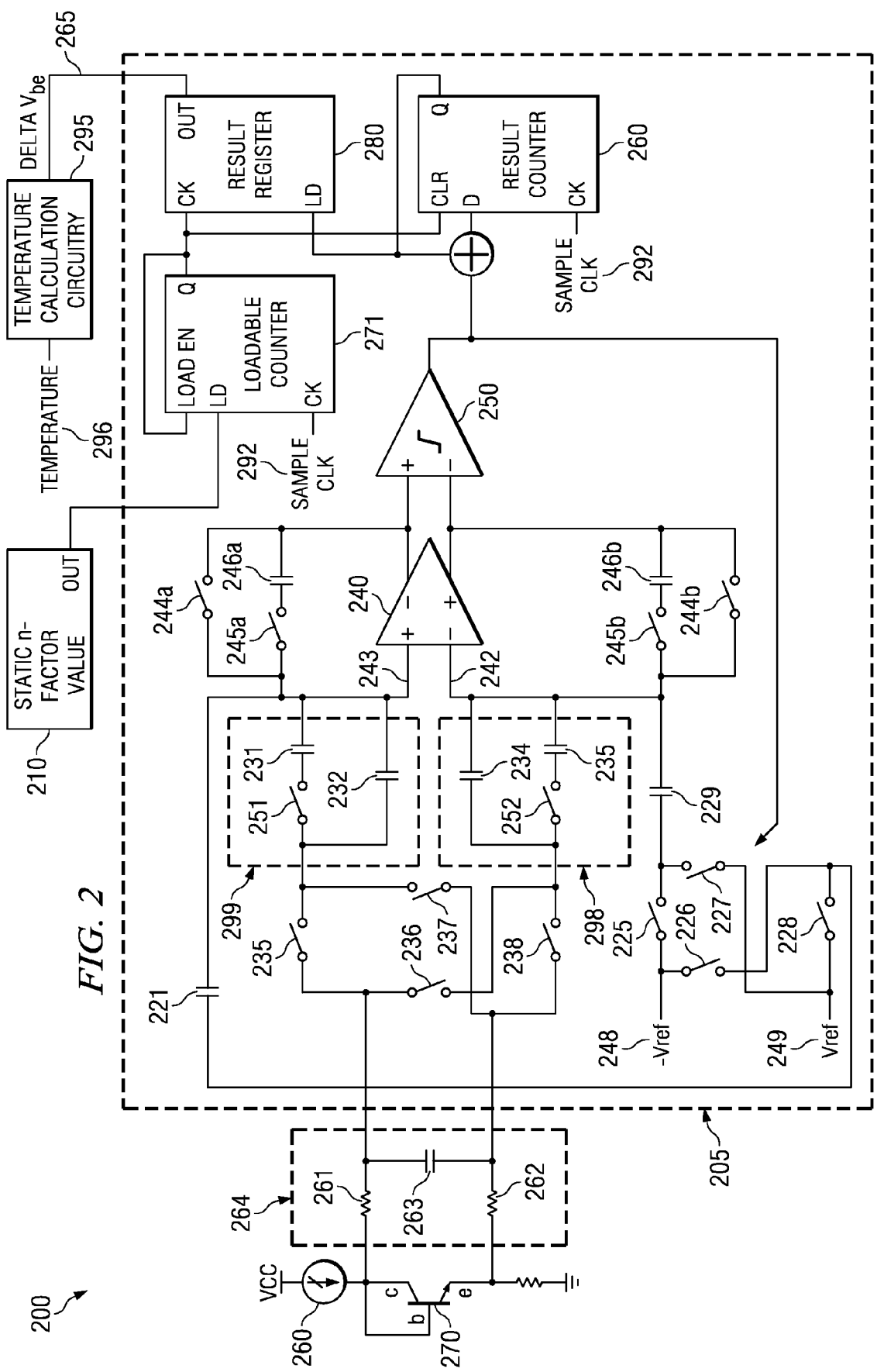
FIG. 2 is a temperature measurement system including a multiple gain input circuit able to perform series resistance compensation in accordance with some embodiments of the present invention.

Turning to FIG. 2, a temperature measurement system 200 in accordance with one or more embodiments of the present invention is shown. Temperature measurement system 200 includes a static n-factor value 210, a temperature calculation circuit 295, and a first order integrating analog to digital converter 205. In addition, temperature measurement system 200 includes a transistor 270 that is diode connected and used as a temperature sensor. It should be noted that while the figure shows an NPN transistor, that other circuits in accordance with one or more embodiments of the present invention may utilize a PNP transistor.

The collector and the base of transistor 270 are electrically coupled to a variable current source 260. Further, the base and emitter of transistor 270 are electrically coupled to analog to digital converter 205 via an input filter 264. Input filter 264 includes a series resistor 261, a series resistor 262 and a capacitor 263. Based on the disclosure provided herein, one of ordinary skill in the art will recognize a variety of input filters that may be used to couple transistor 270 to analog to digital converter 205. In particular, the base of transistor 270 is electrically coupled to an input of analog to digital converter 205 via a switch 235 (i.e., a positive input 243 of an operational amplifier 240 via switch 235 and an input circuit 299) and to another input of analog to digital converter 205 via a switch 236 (i.e., a negative input 242 of operational amplifier 240 via switch 236 and an input circuit 298). The emitter of transistor 270 is electrically coupled to one input of analog to digital converter 205 via a switch 237 (i.e., positive input 243 of operational amplifier 240 via switch 237 and input circuit 299) and to the other input of analog to digital converter 205 via a switch 238 (i.e., negative input 242 of operational amplifier 240 via switch 238 and input circuit 298). It should be noted that while the disclosed embodiments are described as canceling out resistance added in an input filter, that other sources of resistance in the circuit are also canceled out in the same process. Such other sources of resistance may include, but are not limited to, bus resistance, pin resistance, resistances due to transistor non-idealities, and the like.

Analog to digital converter 205 includes a loadable counter 271 that is synchronized to a sample clock 292; a result counter 260 that is also synchronized to sample clock 292; operational amplifier 240; a comparator 250; a number of switches that are also synchronized to sample clock 292; a number of sample and feedback capacitors; a voltage reference 249 and an inverted version of the aforementioned voltage reference 248; and a result register 280. It should be noted that the inverted version of the voltage reference may be generated in any number of ways including, but limited to, applying a negative reference voltage, using a positive reference voltage and a defined sampling sequence, or the like. In particular, the inverted version of voltage reference 248 is electrically coupled to negative input 242 of operational amplifier 240 via a switch 225 and a sample capacitor 229, and to positive input 243 of operational amplifier 240 via a switch 226 and a sample capacitor 221. Voltage reference 249 is electrically coupled to negative input 242 of operational amplifier 240 via a switch 227 and sample capacitor 229, and to positive input 243 of operational amplifier 240 via a switch 228 and sample capacitor 221.

Input circuit 299 includes a sample capacitor 231 and a sample capacitor 232. Sample capacitor 231 is selectively coupled via a switch 251. Input circuit 299 is electrically coupled to positive input 243 of operational amplifier 240. Input circuit 298 includes a sample capacitor 234 and a sample capacitor 235. Sample capacitor 235 is selectively coupled via a switch 252. Input circuit 298 is electrically coupled to negative input 242 of operational amplifier 240. A switch 244a electrically couples a negative output of operational amplifier 240 to positive input 243, and a switch 245a and a feedback capacitor 246a electrically couple the negative output of operational amplifier 240 to positive input 243. A switch 244b electrically couples a positive output of operational amplifier 240 to negative input 243, and a switch 245b and a feedback capacitor 246b electrically couple the positive output of operational amplifier 240 to negative input 242.

The gain of operational amplifier 250 is proportional to the ratio of the input capacitance to the feedback capacitance. Thus, where switch 251 of input circuit 299 and switch 252 of input circuit 298 are open, one gain (i.e., $G_1$) is exhibited by operational amplifier 240. Where switch 251 of input circuit 299 and switch 252 of input circuit 298 are closed, another gain (i.e., $G_2$) is exhibited by operational amplifier 240. Thus analog to digital converter 205 may be operated with two distinct gains depending upon the position of switch 251 and switch 252. In one embodiment of the present invention, capacitors 221, 229, 231, 232, 234 and 235 are all the same size.

The differential output of operational amplifier 240 is also electrically coupled to the differential input of comparator 250. The output of comparator 250 is provided to result counter 260, and as a feedback to control switches 225, 226, 227, 228. Result counter 260 counts up synchronously each time the output of comparator 250 is a logic '1' (i.e., each time the positive output of operational output is greater than the negative output). The number of samples that are counted is equivalent to the value loaded from static n-factor value 210. Each time a sample is completed, loadable counter 271 is decremented. Once the output value of loadable counter 271 is a logic '0', the output value of result counter 260 is stored to result register 280 and result counter 260 is reset. The output (i.e., Delta $V_{be}$ 265) of result register 280 is provided to a temperature calculation circuit 295. The value of Delta $V_{be}$ 265 represents the difference between four or more different base-emitter voltages of transistor 270 compensated for series resistance (e.g., resistor 261 and resistor 262). The number of samples taken before a result is produced corresponds to static n-factor value 210. In some embodiments of the present invention, static n-factor value 210 is replaced with a programmable register. In such cases, the n-factor value is programmable (i.e., the number of samples taken before producing a result is programmable in such a way that it effectively results in use of a different n-factor value).

In operation, variable current source 260 is set to apply four different currents to transistor 270. Further, switches 235, 236, 237, 238, 251 and 252 are configured to apply a different gain when each of the four currents are applied to transistor 270. Upon application of each of the currents, the base-emitter voltage ($V_{be}$) of transistor 270 is detected. In one particular embodiment of the present invention, a first current ($I_1$) is applied with a negative first gain ($-G_1$). Subsequently, a second current ($I_2$) is applied with a positive second gain ($G_2$). Subsequently, a third current ($I_3$) is applied with a negative second gain ($-G_2$). Finally, a fourth ($I_4$) is applied with a positive first gain ($G_1$). To apply $I_1$ with a gain $-G_1$, variable current source 260 provides $I_1$ to transistor 270, switch 236 and switch 237 are closed, switches 244 are closed, switch 235 and switch 238 are open, switches 245 are open, and switch 251 and switch 252 are open. To apply $I_2$ with a gain $G_2$, variable current source 260 provides $I_2$ to transistor 270, switch 236 and switch 237 are opened, switches 244 are closed, switch 235 and switch 238 are closed, switches 245 are open, and switch 251 and switch 252 are closed. To apply $I_3$ with a gain $-G_2$, variable current source 260 provides $I_3$ to transistor 270, switch 236 and switch 237 are closed, switches 244 are closed, switch 235 and switch 238 are open, switches 245 are open, and switch 251 and switch 252 are closed. To apply $I_4$ with a gain $G_1$, variable current source 260 provides $I_4$ to transistor 270, switch 236 and switch 237 are opened, switches 244 are closed, switch 235 and switch 238 are closed, switches 245 are open, and switch 251 and switch 252 are open.

Application of the aforementioned currents results in a corresponding charge being deposited on sample capacitors 232 and 234 where a gain of $G_1$ is selected, or a corresponding charge on sample capacitors 231, 232, 233 and 234 where a gain $G_2$ is selected. After the aforementioned sample phase is completed, the sampled charge is transferred to feedback capacitors 246 during an integration phase. Transferring the charge to feedback capacitors 246 involves opening switches 244 and closing switches 245, and reversing particular ones of the input switches. In particular, where the charge corresponding to the aforementioned $I_1$ at a gain of $-G_1$ was previously sampled and is to be transferred to feedback capacitors 246, switch 236 and switch 237 are opened, switches 244 are opened, switch 235 and switch 238 are closed, switches 245 are closed, and switch 251 and switch 252 are open. Where the charge corresponding to the aforementioned $I_2$ at a gain of $G_2$ was previously sampled and is to be transferred to feedback capacitors 246, switch 236 and switch 237 are closed, switches 244 are opened, switch 235 and switch 238 are opened, switches 245 are closed, and switch 251 and switch 252 are closed. Where the charge corresponding to the aforementioned $I_3$ at a gain of $-G_2$ was previously sampled and is to be transferred to feedback capacitors 246, switch 236 and switch 237 are opened, switches 244 are opened, switch 235 and switch 238 are closed, switches 245 are closed, and switch 251 and switch 252 are closed. Where the charge corresponding to the aforementioned $I_4$ at a gain of $G_1$ was previously sampled and is to be transferred to feedback capacitors 246, switch 236 and switch 237 are closed, switches 244 are opened, switch 235 and switch 238 are opened, switches 245 are closed, and switch 251 and switch 252 are opened. The aforementioned sample phase and integration phase may be accomplished on succeeding edges (using both positive and negative edges) of a clock, on succeeding negative edges of the clock, or on succeeding positive edges of the clock.

Transferring the charge from sample capacitors 231, 232, 233 and 244 to feedback capacitors 246 results in an output from operational amplifier 240 at the input of comparator 250. The output of operational amplifier 240 is processed by comparator 250 to produce either a logic '1' or a logic '0' depending upon the positive output of operational amplifier 240 relative to the negative output of operational amplifier 240. Where the result is a logic '0', result counter 260 is not incremented. In the next pass, the voltage at the base of transistor 270 is again sampled and integrated for the four currents and gains, and the same comparison process is repeated.

Alternatively, on any pass where the result of the comparison is a logic '1', result counter 260 is incremented. Further, where the result is a logic '1', the negative version of the voltage reference 248 is sampled along with the voltage at the base of transistor 270 on the next pass. This is done by closing switch 227, switch 226 and switches 244. This causes charge to build up on reference sample capacitor 221 and sample capacitor 229 representing the negative reference voltage, and charge to build up on the selected set of sample capacitors 231, 232, 234 representing the voltage at the base of transistor 270. The charge from the aforementioned sample capacitors is then transferred to feedback capacitors during an integration phase where switch 225 and switch 227 are closed. By continually re-sampling the voltage at the base of transistor 270 and sampling the negative voltage reference any time a logic '1' is noted, the following residue will remain for a counter value of X and a number of iterations N:

$$\text{Residue} = NV_{in} - XV_{ref}.$$

where $V_{in}$ is the difference between two or more base-emitter voltages. The digital value representing the voltage at the base of transistor 270 is that maintained on result counter 260 at the end of the process. The process is continued for the number of samples loaded into loadable counter 271 (i.e., static n-factor value 210 or another programmed value). An increase in the number of samples reduces the residue and increases the resolution of Delta $V_{be}$ 265.

It should be noted that analog to digital converter 205 may be implemented as another type of analog to digital converter capable of sampling base-emitter voltages derived from application of four or more currents and exhibiting two or more gains. Based on the disclosure provided herein, one of ordinary skill in the art will recognize other types of analog to digital converters that may be used in relation to various embodiments of the present invention.

Further, it should be noted that in some embodiments of the present invention some form of processing circuit may be implemented between transistor 270 and analog to digital converter 205. In such cases circuit operation is substantially as described above with the exception that transistor 270 is electrically coupled to analog to digital converter 205 via the processing circuit and filter 264. In any event, transistor 270 is electrically coupled to analog to digital converter 205. In particular instances, the processing circuit performs the delta-$V_{be}$ computation and analog to digital converter 205 converts the output of the intervening processing circuit.

Figure 1A:
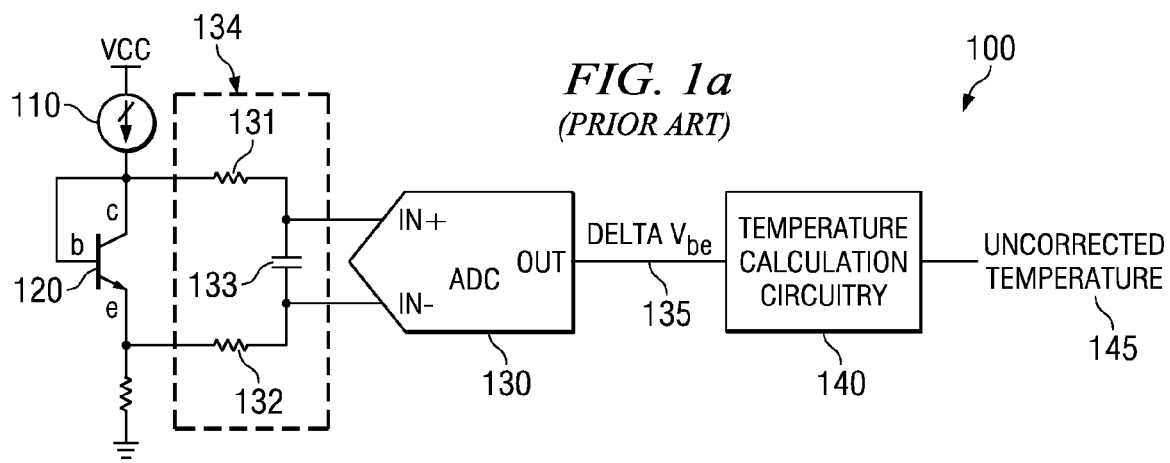
FIG. 1a depicts a simplified temperature measurement system without series resistance compensation.
Figure 1B:
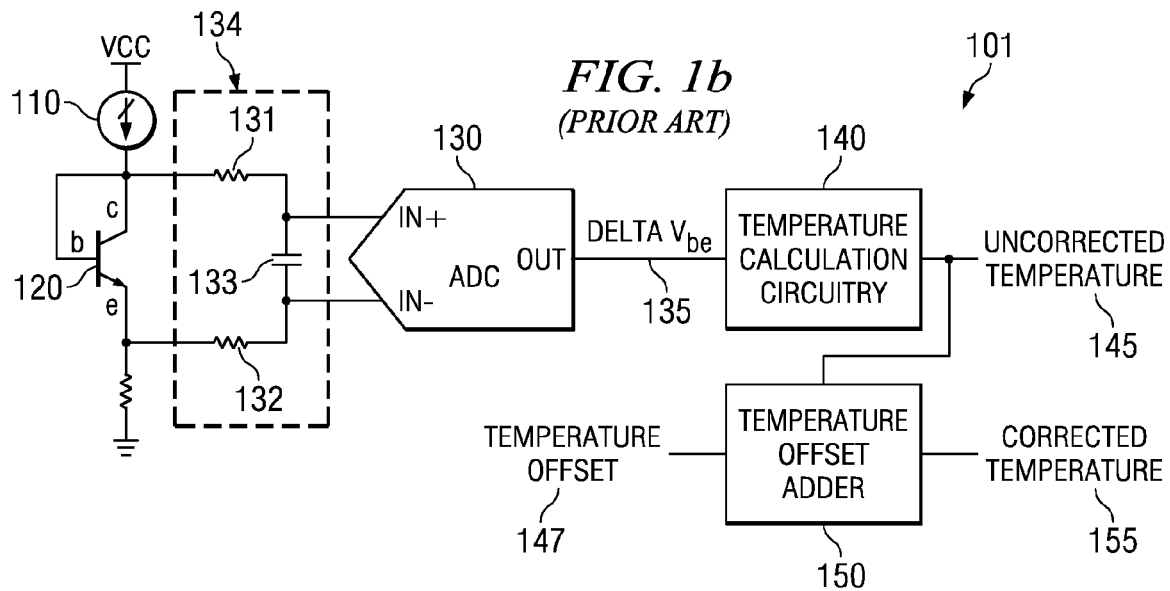
FIG. 1b shows the simplified temperature measurement system of FIG. 1a augmented with a backend error offset circuit.
Figure 3:
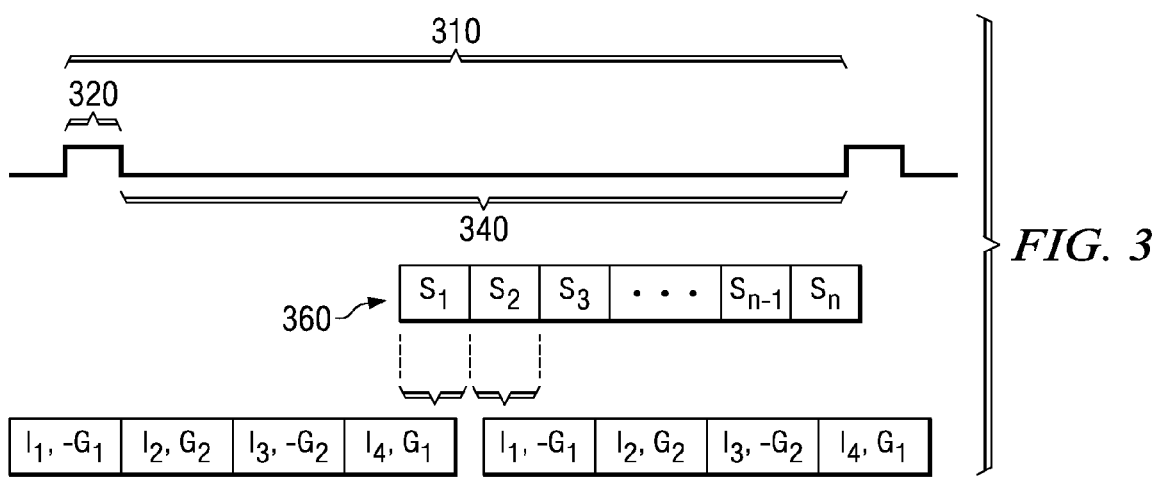
FIG. 3 shows a timing diagram depicting performance of series resistance compensation in a temperature measurement circuit in accordance with one or more embodiments of the present invention.

Turning to FIG. 3, a timing diagram 300 depicts performance of series resistance compensation using temperature measurement system 200 in accordance with one or more embodiments of the present invention. As shown, during an operational period 310, temperature measurement system 200 is initialized during an initialization period 320. After initialization, a number of samples 360 are taken during a sampling period 340. Each sample may include excitation of the sampled transistor using four or more excitation currents ($I_1$, $I_2$, $I_3$, $I_4$) with at least four different gains ($G_1$, $-G_1$, $G_2$, $-G_2$). In one particular embodiment of the present invention, $I_1$ is one hundred microamperes, $I_2$ is fifty microamperes, $I_3$ is five microamperes, $I_4$ is ten microamperes, $G_1$ is a unity gain, and $G_2$ is a gain of two. Based on the disclosure provided herein, one of ordinary skill in the art will recognize a variety of other currents and gains that may be used in accordance with one or more embodiments of the present invention to provide resistance and/or transistor non-ideality compensation.

As shown, during each sampling period represented by samples 361 and 362, transistor 270 is excited using four excitation currents and four different gains: (1) $I_1$ and $-G_1$, (2) $I_2$ and $G_2$, (3) $I_3$ and $-G_2$, and (4) $I_4$ and $G_1$. As shown, this process of sampling and integrating base-emitter voltages corresponding to the aforementioned currents at the particular gains is completed a number of times, n, until the desired resolution of Delta $V_{be}$ 265 is achieved. At the end of sampling period 340 (e.g., once the output of loadable counter 271 is zero), the output of the analog to digital converter (e.g., Delta $V_{be}$ 265) represents a delta $V_{be}$ created using four excitation currents and corresponding gains. In this case, Delta $V_{be}$ 265 is represented by the following equation:

$$\text{Delta } V_{be} = G_2 * (V_{be2} - V_{be3}) - G_1 * (V_{be4} - V_{be1})$$

In the preceding equation, $V_{be1}$ is the base-emitter voltage on transistor 270 upon application of $I_1$. Similarly, $V_{be2}$ is the base-emitter voltage on transistor 270 upon application of $I_2$, $V_{be3}$ is the base-emitter voltage on transistor 270 upon application of $I_3$, and $V_{be4}$ is the base-emitter voltage on transistor 270 upon application of $I_4$. By incorporating four currents at different gains into the generation of Delta $V_{be}$ 265 errors due to series resistance and/or transistor non-idealities are reduced or eliminated.

In particular, to compensate for errors introduced by series resistance, two independent $\Delta V_{be}$ values may be generated and used. Where the two independent $\Delta V_{be}$ values are created with the correct magnitude and gain, a simple subtraction between the $\Delta V_{be}$ values cancels out any effect of the series resistance. The following equations represent the method:

$$G_2 * \Delta V_{be2-3} = G_2 * (V_{be2} - V_{be3}) = G_2 * [(I_{e2} - I_{e3}) * R_S + n*kT/q * \ln(I_{c2}/I_{c3})]; \text{ and}$$

$$G_1 * \Delta V_{be4-1} = G_1 * (V_{be4} - V_{be1}) = G_1 * [(I_{e4} - I_{e1}) * R_s + n*kT/q * \ln(I_{c4}/I_{c1})].$$

In the preceding equations, $V_{be1}$ is the base-emitter voltage on transistor 270 upon application of $I_1$. Similarly, $V_{be2}$ is the base-emitter voltage on transistor 270 upon application of $I_2$, $V_{be3}$ is the base-emitter voltage on transistor 270 upon application of $I_3$, and $V_{be4}$ is the base-emitter voltage on transistor 270 upon application of $I_4$. Again, the 'n' term is known as the non-ideality factor or emission coefficient is assumed to be a constant (n=1.008) for diodes and transistors. $I_{e1}$ is the current passing through the emitter upon application of a first current, and $I_{c1}$ is the current passing through the collector upon application of the same current. $I_{e2}$, $I_{c2}$, $I_{e3}$, $I_{c3}$, $I_{e4}$, $I_{c4}$, are similarly emitter and collector currents corresponding to the application of the respective second excitation current, third excitation current, and fourth excitation current. $R_s$ is the series resistance.

Each of the preceding equations includes an error component that is a function of the series resistance $R_s$. In particular, the error component of $G_2 * \Delta V_{be2-3}$ is $G_2 * (I_{e2} - I_{e3}) * R_s$, and the error component of $G_1 * \Delta V_{be4-1}$ is $G_1 * (I_{e4} - I_{e1}) * R_s$. Where the gains ($G_1$ and $G_2$) and the currents ($I_1$, $I_2$, $I_3$, $I_4$) are appropriately selected, subtraction of $G_1 * \Delta V_{be4-1}$ from $G_2 * \Delta V_{be2-3}$ causes the error components to drop out and leaves a differential base-emitter voltage value that is proportional to the absolute temperature of transistor 270. The following equation represents Delta $V_{be}$ 265 and is equivalent to subtracting $G_1 * \Delta V_{be4-1}$ from $G_2 * \Delta V_{be2-3}$:

Delta $V_{be} = G_2 * [(I_{e2} - I_{e3}) * R_s + n * kT/q * \ln(I_{c2}/I_{c3})] - G_1 * [(I_{e4} - I_{e1}) * R_s + n * kT/q * \ln(I_{c4}/I_{c1})]$.

As an example, where $I_{c2} = 10 * I_{c3}$, $I_{c4} = 2 * I_{c2}$, $I_{c1} = 2 * I_{c3}$, $I_{e2} = 10 * I_{e3}$, $I_{e4} = 2 I_{e2}$, $I_{e1} = 2 * I_{e3}$, and $G_2 = 2 * G_1$, then the following Delta $V_{be}$ 265 equation reduces to:

Delta $V_{be} = 2 * G_1 * [(10 * I_{e3} - I_{e3}) * R_s + n * kT/q * \ln(10)] - G_1 * [(20 * I_{e3} - 2 I_{e3}) * R_s + n * kT/q * \ln(10)]$;

thus,

Delta $V_{be} = G_1 * [n * kT/q * \ln(10)]$.

As can be seen from the preceding equations, Delta $V_{be}$ 265 does not include an error component due to the series resistance. Based on the disclosure provided herein, one of ordinary skill in the art will recognize a variety of ratios between the aforementioned currents and gains that can be used to eliminate the error component from Delta $V_{be}$ 265 in accordance with one or more embodiments of the present invention. Further, based on the disclosure provided herein, one of ordinary skill in the art will recognize a number of excitation currents and gains that may be used in relation to one or more embodiments of the present invention to perform serial resistance compensation.

FIG. 4 is a flow diagram 400 showing a method in accordance with various embodiments of the present invention for performing series resistance compensation in a temperature measurement scenario. Following flow diagram 400, a sample count is initialized (block 405), and a result count is initialized (block 410). In some embodiments of the present invention this initialization may include loading a predetermined number of samples to be taken into a loadable down counter, and resetting a result counter to zero. A gain of $-G_1$ and an excitation current $I_1$ is selected (block 415), and a temperature measurement circuit is excited using the aforementioned parameters (block 420). The temperature measurement circuit then samples and integrates the base-emitter voltage corresponding to the aforementioned excitation parameters (block 425).

Next, a gain of $G_2$ and an excitation current $I_2$ is selected (block 430), and the temperature measurement circuit is excited using the aforementioned parameters (block 435). The temperature measurement circuit then samples and integrates the base-emitter voltage corresponding to the aforementioned excitation parameters (block 440). Subsequently, a gain of $-G_2$ and an excitation current $I_3$ is selected (block 445), and the temperature measurement circuit is excited using the aforementioned parameters (block 450). The temperature measurement circuit then samples and integrates the base-emitter voltage corresponding to the aforementioned excitation parameters (block 455). Then, a gain of $G_1$ and an excitation current $I_4$ is selected (block 460), and the temperature measurement circuit is excited using the aforementioned parameters (block 465). The temperature measurement circuit then samples and integrates the base-emitter voltage corresponding to the aforementioned excitation parameters (block 470).

Once the preceding four sample and integration phases have been performed (block 415 to block 470), a comparison of the output of the integrator is performed (block 475). Where the result of the comparison is positive (block 475), the result count is incremented (block 480). It is next determined if the predetermined number of samples has been taken (block 485). Where all of the samples have not yet been taken (block 485), the processes of block 415 through block 480 are repeated. Alternatively, where the predetermined number of samples has been taken (block 485), the result is provided to a temperature calculation circuit (block 495). The provided result represents a Delta $V_{be}$ incorporating series resistance compensation in accordance with various embodiments of the present invention.

In conclusion, the present invention provides novel systems, devices, methods for data temperature measurement. While detailed descriptions of one or more embodiments of the invention have been given above, various alternatives, modifications, and equivalents will be apparent to those skilled in the art without varying from the spirit of the invention. For example, other embodiments of the present invention, Delta $V_{be}$ 265 may be generated over two operational periods 310. In the first operational period 310, a gain of $G_1$ is selected and transistor 270 is repeatedly excited at a fourth current followed by a first current. This process is repeated for an appropriate number of samples to generate the aforementioned $G_1 * \Delta V_{be4-1}$. During the second operational period 310, a gain of $G_2$ is selected and transistor 270 is repeatedly excited at a second current followed by a third current. This process is again repeated for an appropriate number of samples to generate the aforementioned $G_2 * \Delta V_{be2-3}$. In a post process, $G_1 * \Delta V_{be4-1}$ may be subtracted from $G_2 * \Delta V_{be2-3}$ to yield Delta $V_{be}$ 265. As another example, the processes and systems are shown using a bipolar transistor, but other embodiments of the present invention may use other types of transistors or junction devices. Therefore, the above description should not be taken as limiting the scope of the invention, which is defined by the appended claims.

What is claimed is:

1. A method for resistance compensated temperature measurement, the method comprising:
    providing a diode connected transistor;
    applying a first current to the diode connected transistor, wherein a first base-emitter voltage corresponding to the first current is exhibited by the diode connected transistor;
    applying a second current to the diode connected transistor, wherein a second base-emitter voltage corresponding to the second current is exhibited by the diode connected transistor;
    applying a third current to the diode connected transistor, wherein a third base-emitter voltage corresponding to the third current is exhibited by the diode connected transistor;
    applying a fourth current to the diode connected transistor, wherein a fourth base-emitter voltage corresponding to the fourth current is exhibited by the diode connected transistor; and combining the first base-emitter voltage, the second base emitter voltage, the third base-emitter voltage and the fourth base emitter voltage, wherein a resistance error is eliminated.

2. The method of claim 1, wherein the method further comprises:
providing an analog to digital converter, wherein the analog to digital converter is electrically coupled to the diode connected transistor, wherein the analog to digital converter is configurable to operate at a first gain, a second gain, a third gain, and a fourth gain;
sampling the first base-emitter voltage, wherein the analog to digital converter is configured to select the first gain in association with sampling the first base-emitter voltage;
sampling the second base-emitter voltage, wherein the analog to digital converter is configured to select the second gain in association with sampling the second base-emitter voltage;
sampling the third base-emitter voltage, wherein the analog to digital converter is configured to select the third gain in association with sampling the third base-emitter voltage; and
sampling the fourth base-emitter voltage, wherein the analog to digital converter is configured to select the fourth gain in association with sampling the fourth base-emitter voltage.

3. The method of claim 2, wherein combining the first base-emitter voltage, the second base emitter voltage, the third base-emitter voltage and the fourth base emitter voltage includes integrating all of the first base-emitter voltage, the second base-emitter voltage, the third base emitter voltage and the fourth base emitter voltage.

4. The method of claim 2, wherein the analog to digital converter includes a differential operational amplifier, a differential comparator, and a result counter.

5. The method of claim 4, wherein the base of the transistor is electrically coupled to a first input of the differential operational amplifier via a first input circuit and to a second input of the differential operational amplifier via a second input circuit, and wherein the emitter of the transistor is electrically coupled to the first input of the differential operational amplifier via a third input circuit and to the second input of the differential operational amplifier via a fourth input circuit.

6. The method of claim 5, wherein the first input circuit and the third input circuit share a first gain circuit, wherein the first gain circuit includes a first selectable capacitance and a second selectable capacitance, wherein the second input circuit and the fourth input circuit share a second gain circuit, and wherein the second gain circuit includes a third selectable capacitance and a fourth selectable capacitance.

7. The method of claim 6, wherein configuring the analog to digital converter to select the first gain and configuring includes selecting the first selectable capacitance of the first gain circuit and selecting the third selectable capacitance of the second gain circuit, and wherein configuring the analog to digital converter to select the second gain includes selecting the second selectable capacitance of the first gain circuit and selecting the fourth selectable capacitance of the second gain circuit.

8. The method of claim 2, wherein the first gain is the same magnitude as the fourth gain, and wherein the second gain is the same magnitude as the third gain.

9. The method of claim 8, wherein the first gain is a negative gain, wherein the second gain is a positive gain, wherein the third gain is a negative gain, and wherein the fourth gain is a positive gain.

10. The method of claim 9, wherein the magnitude of the first current is two times the magnitude of the second current, wherein the magnitude of the fourth current is two times the magnitude of the third current, and wherein the magnitude of the second current is ten times the magnitude of the third current.

11. A temperature measurement system, wherein the temperature measurement system comprises:
a transistor;
a variable current source; wherein the variable current source is electrically coupled to the transistor; wherein the variable current source is operable to provide a first current, a second current, a third current and a fourth current; wherein the first current produces a first base-emitter voltage on the transistor; wherein the second current produces a second base-emitter voltage on the transistor; wherein the third current produces a third base-emitter voltage on the transistor; and wherein the fourth current produces a fourth base-emitter voltage on the transistor; and
an analog to digital converter, wherein the analog to digital converter is operable sample and integrate the first base-emitter voltage while applying a first gain, wherein the analog to digital converter is operable sample and integrate the second base-emitter voltage while applying a second gain, wherein the analog to digital converter is operable sample and integrate the third base-emitter voltage while applying a third gain, wherein the analog to digital converter is operable sample and integrate the fourth base-emitter voltage while applying a fourth gain, and wherein the analog to digital converter is operable to provide an integrated output combining the first base-emitter voltage, the second base emitter voltage, the third base emitter voltage and the fourth base emitter voltage.

12. The system of claim 11, wherein a magnitude of the first current, a magnitude of the second current, a magnitude of the third current, a magnitude of the fourth current, a sign and magnitude of the first gain, a sign and magnitude of the second gain, a sign and magnitude of the third gain, and a sign and magnitude of the fourth gain are selected such that a resistance error is eliminated from the integrated output.

13. The system of claim 11, wherein the analog to digital converter includes a differential operational amplifier, a differential comparator, and a result counter.

14. The system of claim 13, wherein the base of the transistor is electrically coupled to a first input of the differential operational amplifier via a first input circuit and to a second input of the differential operational amplifier via a second input circuit, and wherein the emitter of the transistor is electrically coupled to the first input of the differential operational amplifier via a third input circuit and to the second input of the differential operational amplifier via a fourth input circuit.

15. The system of claim 14, wherein the first input circuit and the third input circuit share a first gain circuit, wherein the first gain circuit includes a first selectable capacitance and a second selectable capacitance, wherein the second input circuit and the fourth input circuit share a second gain circuit, and wherein the second gain circuit includes a third selectable capacitance and a fourth selectable capacitance.

16. The system of claim 15, wherein configuring the analog to digital converter to select the first gain and configuring includes selecting the first selectable capacitance of the first gain circuit and selecting the third selectable capacitance of the second gain circuit, and wherein configuring the analog to digital converter to select the second gain includes selecting the second selectable capacitance of the first gain circuit and selecting the fourth selectable capacitance of the second gain circuit.

17. A method for performing temperature measurements, the method comprising:

providing a transistor;

exciting the transistor with at least four sequential input signals of different magnitudes, wherein the transistor exhibits a sequence of output signals corresponding to the four sequential input signals;

sensing the sequence of output signals using a different gain for each of the output signals included in the sequence of output signals;

combining the sequence of output signals to produce a combined output, wherein combining the sequence of output signals eliminates a resistance error.

18. The method of claim 17, wherein the transistor is a diode connected bipolar transistor, and wherein the sequence of output signals are base-emitter voltages of the diode connected bipolar transistor.

19. The method of claim 18, wherein the diode connected bipolar transistor is selected from a group consisting of: an NPN device, and a PNP device.

20. The method of claim 17, wherein the method further comprises:

determining the temperature of the transistor based at least in part on the combined output.

* * * * *